P. W. SHIELDS.
MACHINE FOR FILLING AND CAPPING BOTTLES.
APPLICATION FILED DEC. 9, 1911. RENEWED DEC. 2, 1914.
1,195,516.
Patented Aug. 22, 1916.
6 SHEETS—SHEET 3.
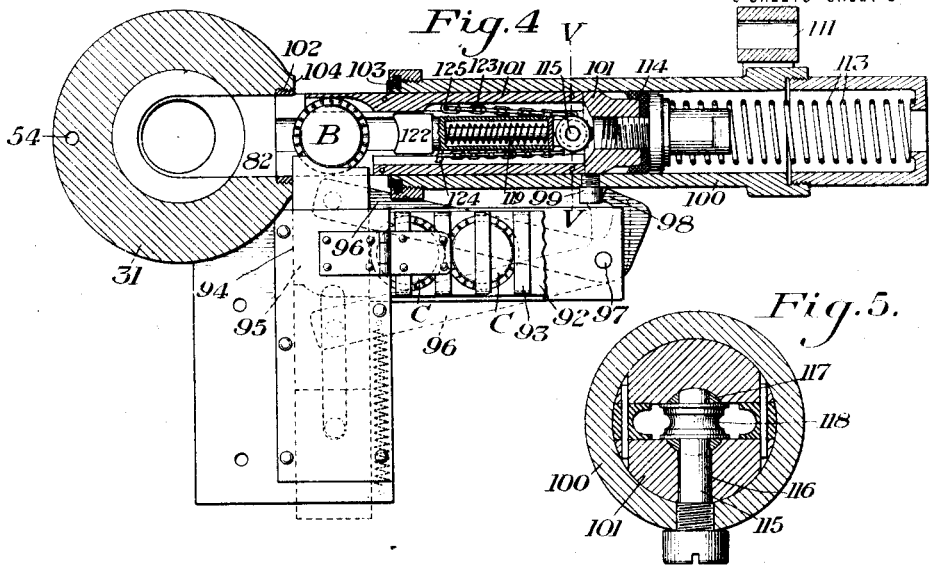
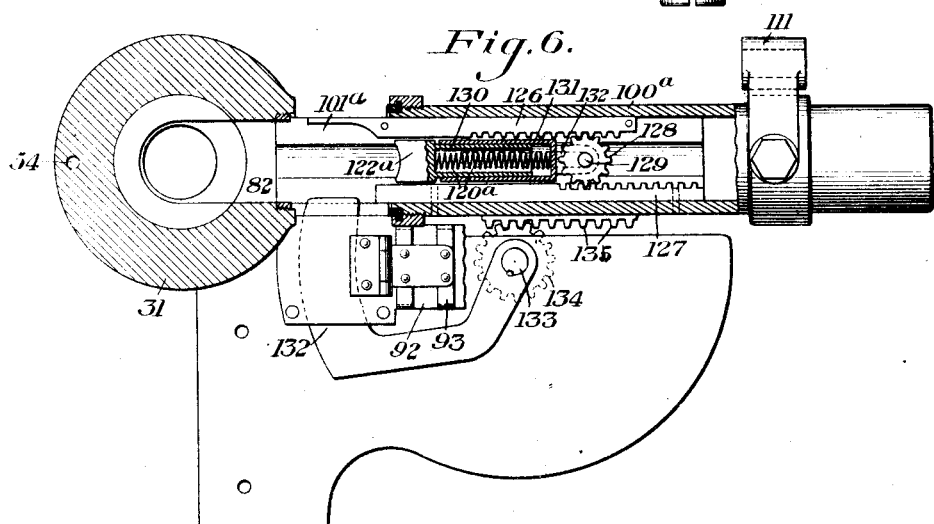
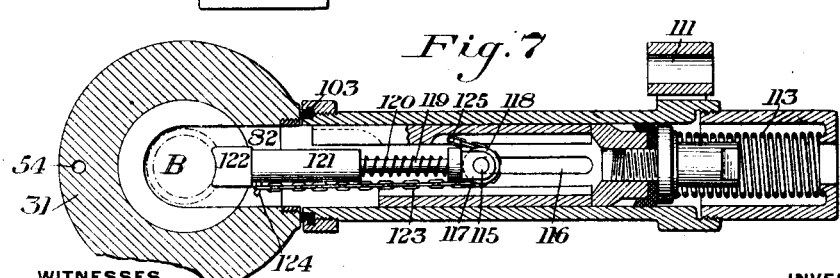
WITNESSES
INVENTOR
P. W. Shields,

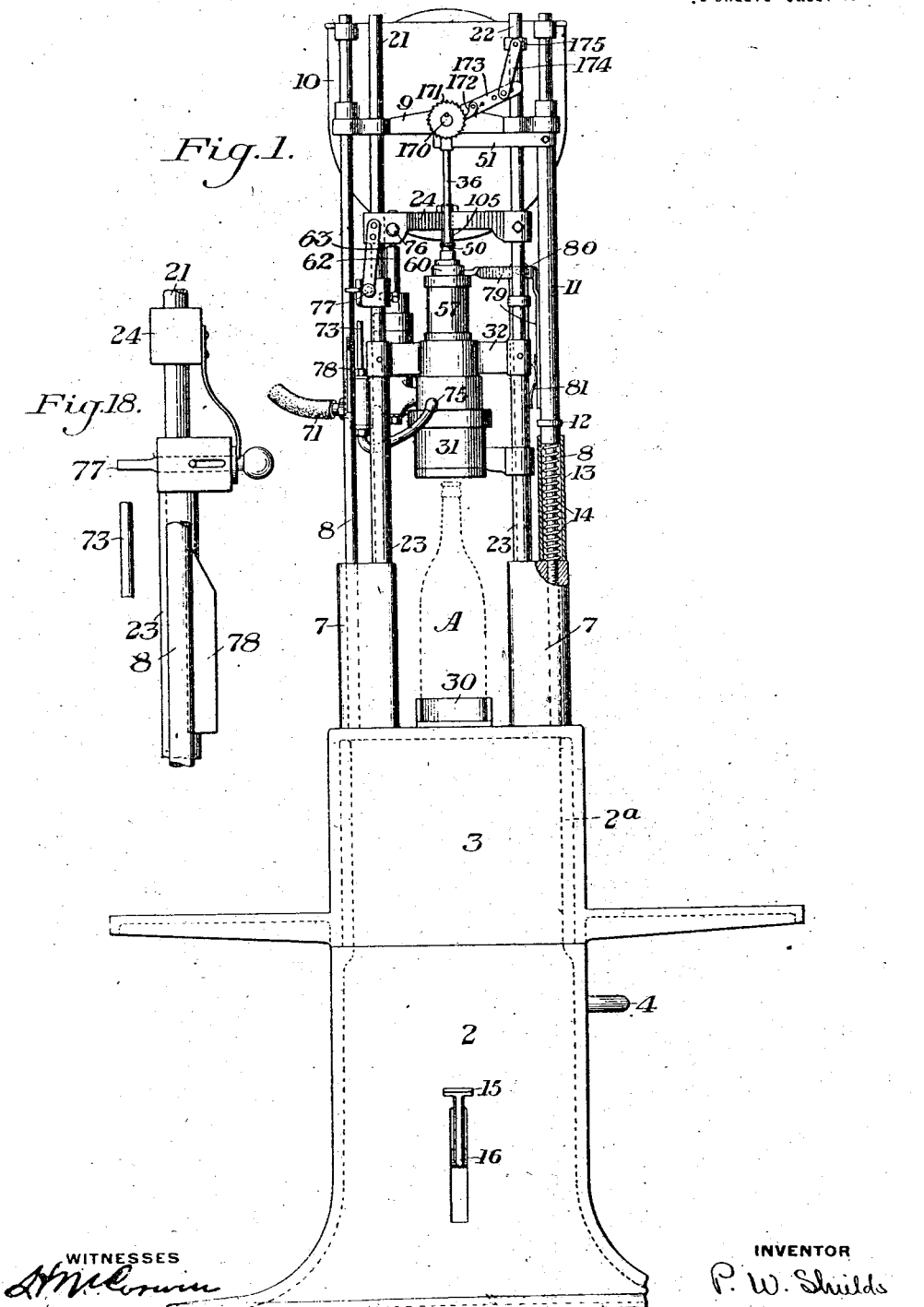

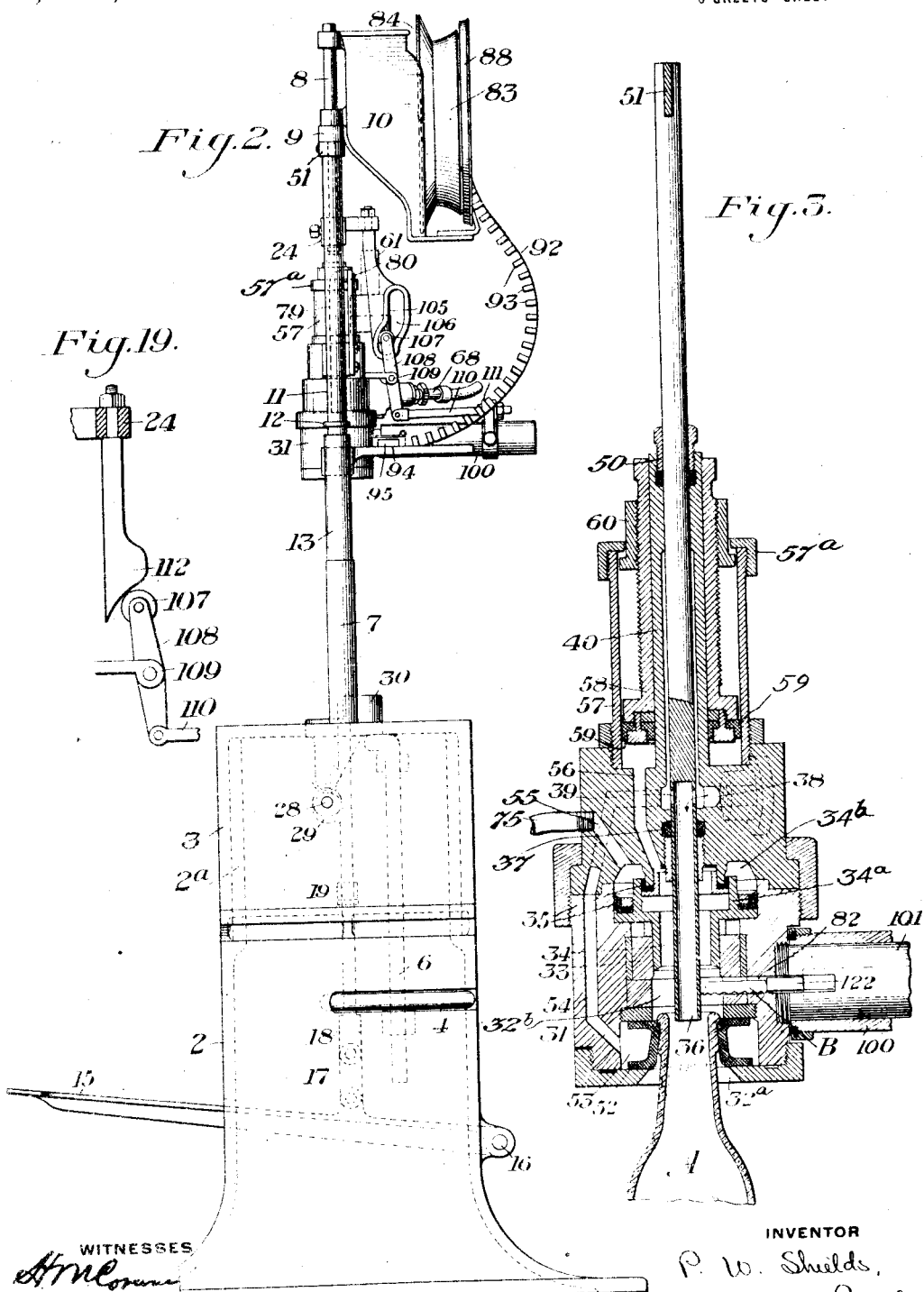

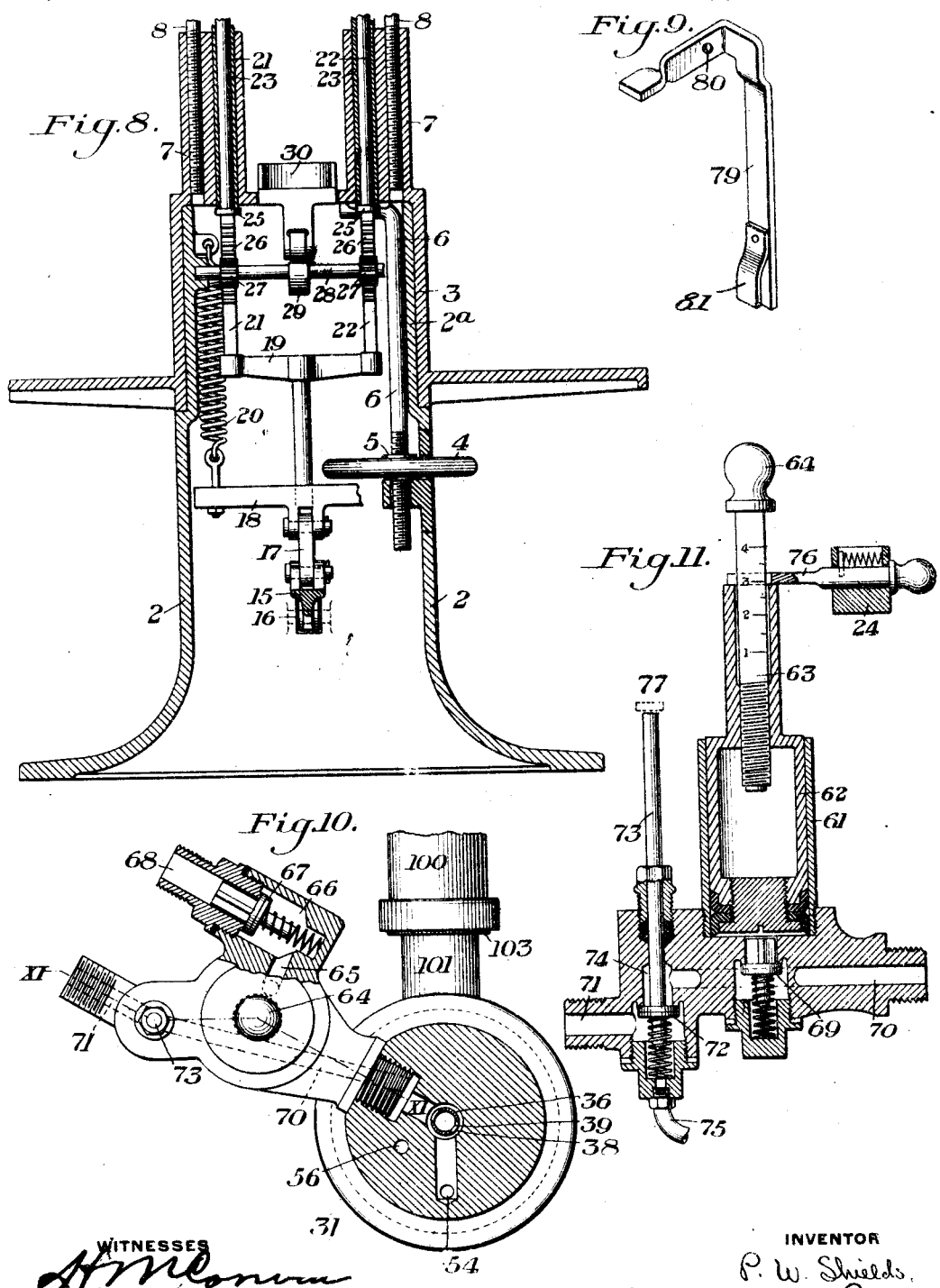

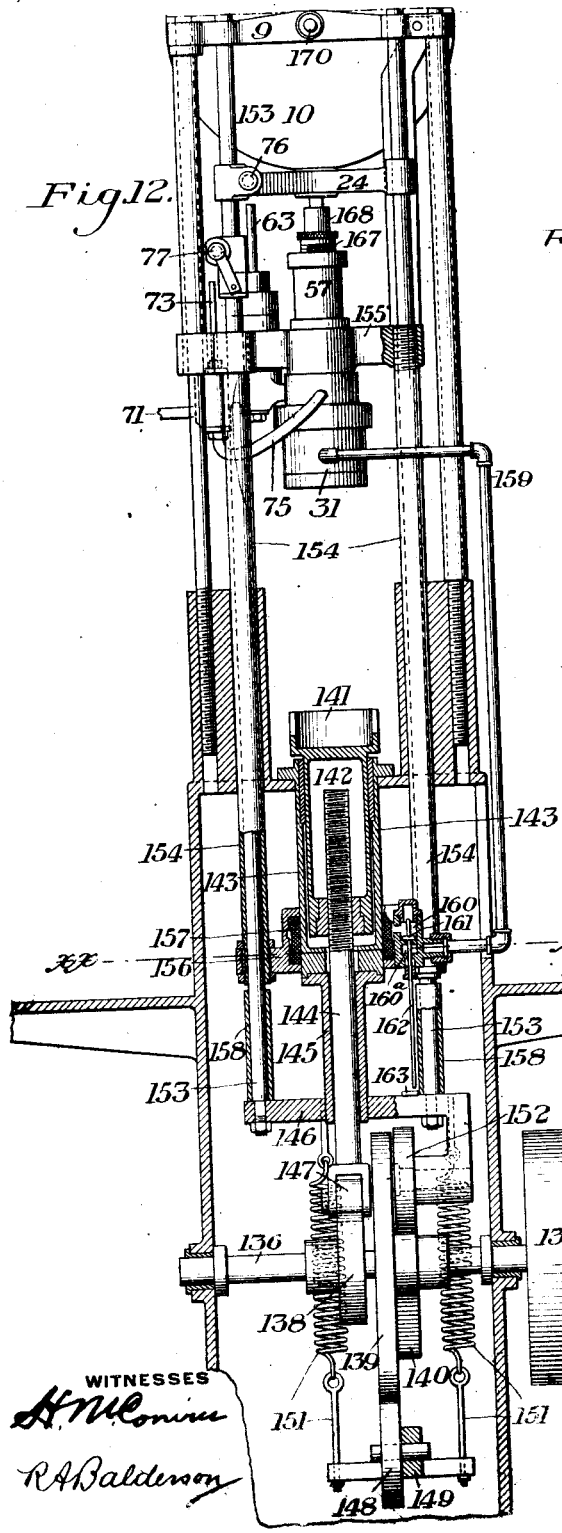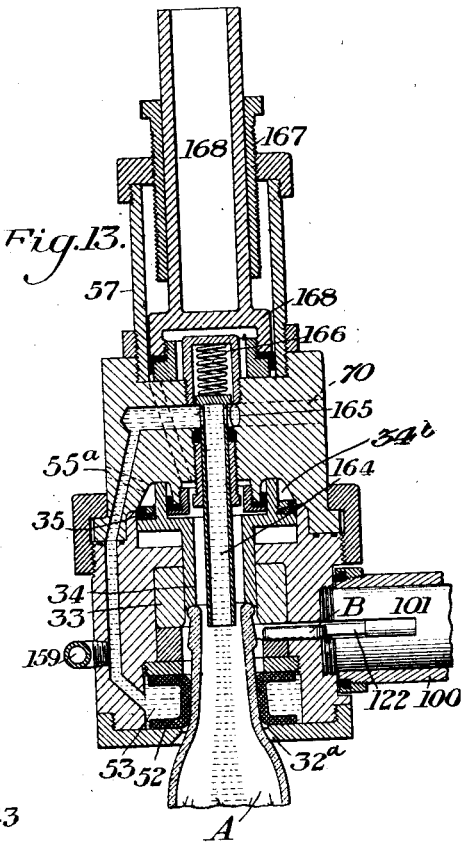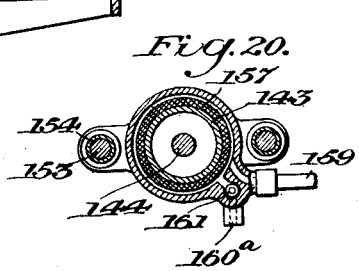

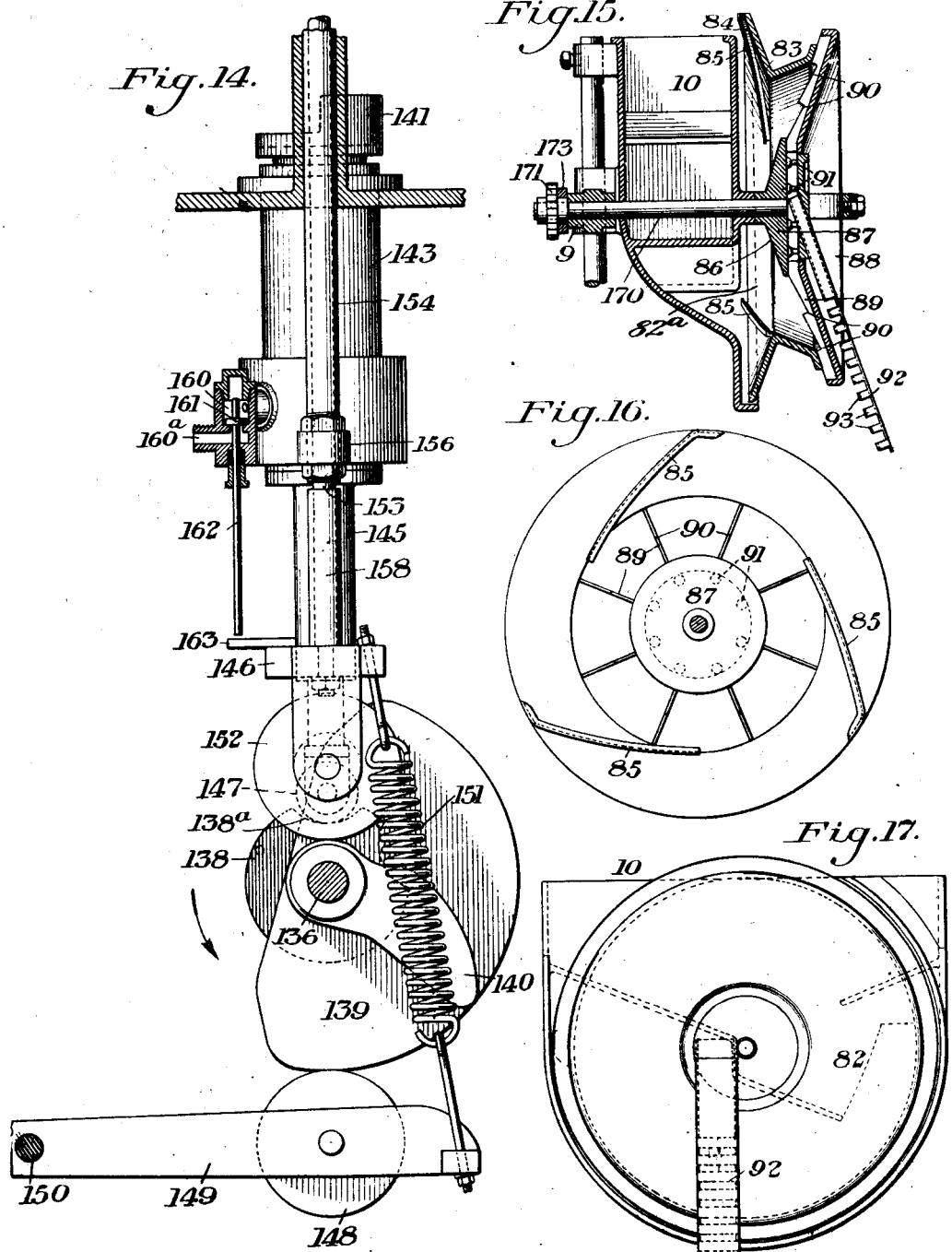

UNITED STATES PATENT OFFICE.

PATRICK W. SHIELDS, OF PITTSBURGH, PENNSYLVANIA.

MACHINE FOR FILLING AND CAPPING BOTTLES.

1,195,516.      Specification of Letters Patent.      Patented Aug. 22, 1916.

Application filed December 9, 1911, Serial No. 664,825. Renewed December 2, 1914. Serial No. 875,188.

*To all whom it may concern:*

Be it known that I, PATRICK W. SHIELDS, of Pittsburgh, Allegheny county, Pennsylvania, have invented a new and useful Machine for Filling and Capping Bottles, of which the following is a full, clear, and exact description, reference being had to the accompanying drawings, forming part of this specification, in which—

Figure 1 is a front view, partly broken away, of a machine embodying one form of my invention; Fig. 2 is a side elevation of the same; Fig. 3 is an enlarged sectional view showing the filling head and adjacent parts; Fig. 4 is a horizontal section taken through the filling head, and showing the mechanism for feeding the cap into the head; Fig. 5 is a section on the line V—V of Fig. 4; Fig. 6 is a view similar to Fig. 4, but showing a modification; Fig. 7 is a view similar to Fig. 4, but with certain parts omitted and showing the cap-feeding plunger in its advanced position; Fig. 8 is a detail sectional view of the lower portion of the machine; Fig. 9 is a detail perspective view of one of the parts hereinafter described; Fig. 10 is a sectional view showing the parts which feed the aerated water and syrup into the filling head; Fig. 11 is a sectional view on the irregular line XI—XI of Fig. 10; Fig. 12 is a view partly in front elevation and partly in vertical section showing a modified form of machine; Fig. 13 is a vertical section of the filling head of the machine of Fig. 12; Fig. 14 is a view partly in side elevation and partly in vertical section of a portion of the machine shown in Fig. 12; Fig. 15 is a vertical section of the cap-feeding hopper and selector; Fig. 16 is a detail view of a part of the same; Fig. 17 is a front elevation of the same; Figs. 18 and 19 are detail views hereinafter referred to, and Fig. 20 is a partial section on the line XX—XX, of Fig. 12.

My invention has relation to machines for filling bottles with aerated or carbonated waters, either with or without the desired proportion of syrup, and for closing them with a metallic stopper when filled.

An object of my invention is to provide a machine of this character which is simple in its construction and mode of operation, and by means of which bottles may be rapidly filled and capped.

A further and more specific object of my invention is to provide a machine of this nature having improved operative mechanism for the various parts; also to improve the construction and arrangement of the filling head; and of the cap-selecting and feeding mechanism.

Other novel features and objects of my invention will be hereinafter pointed out.

The nature of my invention will be best understood by reference to the accompanying drawings, in which I have shown the preferred forms thereof, and which will now be described, it being premised, however, that various changes can be made in the details of construction and arrangement of the various parts without departing from the spirit and scope of my invention as defined in the appended claims.

In these drawings, the numeral 2 designates the base of the machine, having the reduced upper portion 2ª (see Fig. 8) over which telescopically fits the vertically adjustable table section 3. This table section, together with the parts supported and carried thereby, may be vertically adjusted by the hand wheel 4 whose hub 5 forms a nut working on the adjusting rod or shaft 6. Rising from this adjustable table section are two posts or columns 7, in which are threaded the lower end portions of two upwardly extending rods 8 connected near their upper ends by a fixed cross bar 9, and supporting a hopper 10 for the caps or crowns. Loosely surrounding one of the rods 8 is a sleeve 11 having near its lower portion a flange or collar 12, whose lower end portion telescopically engages a tubular extension 13 on one of the columns 7. A spring 14 is seated within the part 13 with its upper end bearing against the lower end of the sleeve member 11.

15 is a foot or treadle lever pivoted to the base at 16, and connected by a link 17 with a cross-bar 18, which carries a cross-head 19.

20 are retracting springs connected to the cross-bar 18.

Connected to the cross-head 19 are two actuating rods 21 and 22, which extend upwardly through the columns 7 and through sleeve members 23, the rods being arranged to reciprocate through these sleeve members, and the sleeve members being also capable of vertical movement on the rods. The rods 21 and 22 are guided near their upper ends in the cross-bar 9; and below said cross bar they are connected by a cross-head 24. Each of the sleeve members 23 rests at its lower end upon a flange or collar 25 on the rod 21 or 22. Below these collars each of the rods is formed with a toothed rack portion 26, these rack portions engaging pinions 27, on a transverse shaft 28 journaled in the reduced portion 2ª of the base. The shaft 28 carries a cam 29, upon which rests a vertically movable bottle support 30, in which the bottles to be filled and capped are seated.

31 designates a filling head, which is carried by a cross-bar 32, whose ends are secured to the upper end portions of the sleeves 23. The filling head is formed at its lower end with an opening 32ª to receive the neck portion of the bottle A to be filled, and which communicates with an internal air chamber 32ᵇ. Mounted within the filling head is a cap applying die 33 and a vertically movable hollow plunger 34, having a piston 34ª movably mounted in a chamber 34ᵇ. 35 designates packings for this plunger 34 and piston 34ª for preventing leakage from the chamber 34ᵇ. 36 is a filling tube arranged centrally within the head, and which extends upwardly through a gland 37 into a receiving chamber 38, with which it communicates by openings 39. Above these openings 39 the tube is made in the form of a solid rod which extends upwardly through an upward reduced extension 40 of the head and through the gland 50, its upper end being connected to an arm 51 which in turn is connected to the upper end of the sleeve member 11. 52 designates a flexible clamping and packing member, which is adapted to fit around the neck portion of the bottle when introduced into the head and form an air-tight joint therewith, in the manner hereinafter described. The chamber 53, in which this packing is seated is connected by a port or passage 54 with the receiving chamber 38. 55 is a port or passage in the filling head 31 in communication with the chamber 34ᵇ, and leading from this port to the supply connection for the carbonated or aerated water supply is a pipe 75, see Figs. 1 and 11. If desired this chamber 34ᵇ may be connected to any suitable source of pressure for actuating the plunger for the purpose hereinafter described. 56 is a port or passage leading upwardly from said chamber 32ᵇ into the lower end of an air cylinder 57 which is screwed into the upper portion of the head, and which surrounds the upward extension 40 thereof.

57ª is a cylinder head or cap secured to the upper end of the cylinder 57. 58 is a piston or plunger within this cylinder 57 and arranged to reciprocate vertically on the said extension 40 of the filling head, and 59 designates packing for the lower enlarged end portion of the piston.

60 is a sleeve member extending through the cap 57ª and is provided with a flanged lower end in the upper portion of the cylinder 57, and having a screw-threaded connection with the upper end portion of the piston 58. The piston 58 can be adjusted on the screw-threaded connection with this sleeve member so as to vary the capacity of the air cylinder in accordance with the particular size of bottles to be filled. The cap 57ª forms a stop for the upward movement of the piston 58, the piston being normally held in the position shown in Fig. 3 by the frictional engagement between the packing 59 and the cylinder 57. The piston is normally moved downwardly from the position shown in Fig. 3 by means of the spring actuated bell-crank 79, as hereinafter described, after the pressure has been relieved from the cylinder.

61 designates the cylinder of a syrup pump, and 62 the plunger thereof. This plunger has a rod or stem 63 adjustably secured therein and terminating at its upper end in a head 64. The cylinder of the syrup pump is connected at its lower end by port 65 with a valve chamber 66 (see Fig. 10), containing a spring valve 67, which controls a syrup supply passage 68, leading preferably to an elevated syrup tank, not shown.

69 is a spring valve, which controls the outlet from the cylinder of the syrup pump to the passage 70, which leads into the receiving chamber 38 of the filling head.

71 (Figs. 1, 10 and 11) is the supply connection for the carbonated or aerated water, and which is controlled by a spring valve 72 having the upwardly projecting stem 73. This valve controls the passage 74, which communicates with the passage 70 so that after the valve 69 has been opened to admit syrup into the passage 70 the discharge of syrup will be followed by a discharge of the water, thereby washing the syrup through the head into the bottle.

The piston or plunger 62 of the syrup pump is actuated by a spring-pressed fork 76, which engages the rod or stem 63, and which is connected to the cross-head 24 before described. By adjusting the screw 63 so as to vary the distance between its head 64 and the upper end of the piston or plunger 62, and thereby the amount of lost motion of the fork 76, the proper supply of syrup can be accurately regulated and controlled. The water valve 72 is actuated as follows:—Its stem 73 projects upwardly into the path of the tappet 77 (see Fig. 1), which is carried on the rod 21, so that as the rod descends this tappet strikes the upper end of said stem and depresses it and thereby unseats the valve 72. Inasmuch as the cross-head 24, which will presently be described, is, in the operation of the machine, moved downwardly beyond the point at which the valve 72 is to be unseated, and during which continued movement of said valve should be again closed, the tappet 77, after its initial valve opening movement, is moved out of position to engage the valve stem by means of the cam 78 (see Figs. 1 and 18) on one of the rods 8.

79 is a bell crank lever pivoted at 80, and having its short arm engaging a slot in the sleeve member 60 at the upper end of the air cylinder 57. The vertical arm of this lever extends down adjacent to the sleeve member 11. When the machine is in its position of rest, the lower end of this vertical arm is some distance above the collar 12 on said sleeve member 11, and is normally held outwardly against said sleeve member by a spring 81. (See Fig. 1.)

Extending into one side of the filling head is a cap-feeding passage 82, and through which a cap or crown B (Fig. 3) is adapted to be fed in the manner presently described. During the filling operation this cap or crown is, as shown in Fig. 3, pressed against the filling tube 36, which stops it from further inward movement into the head.

The operation of filling the bottle is as follows:—An empty bottle is placed on the vertically movable bottle support 30. The operator then depresses the foot lever or treadle 15, which raises the bottle toward the bottom opening 32ª of the filling head through the medium of the shaft 28 and cam 29. This same movement of the treadle pulls the actuating rods 21 and 22 downwardly, the flanges or collars 25 at their lower ends moving away from the lower ends of the sleeve members 23. The weight of the filling head being carried on these sleeve members, said filling head will now move downwardly with the sleeve members, causing the lower end of the vertical arm of the bell crank lever 79 to engage the collar 12 on the sleeve member 11. This will force the sleeve member 11 downwardly against the spring 14 until such time as it is stopped by the engagement of the collar 12 with the upper end of the part 13, leaving the spring 14 under compression. This downward movement of the sleeve 11, through the arm 51, forces the filling tube 36 downwardly into the bottle, whose neck portion is now within the head, as shown in Fig. 3. At this time the syrup and water-admitting valves are opened in the manner before described, by the downward movement of the cross-head 24, and the mixed water and syrup are admitted to the bottle. At the same time the passage 54 will be filled, causing pressure in the chamber 53, and pressing the packing 52 tightly around the neck of the bottle to make an air-tight joint or seal. The cap passageway is at this time closed in an air-tight manner in a way to be presently described, and there is formed within the head an air-tight chamber into which air escapes from the bottle as it is filled. This escaping air builds up a pressure within the internal chamber of the head, and, acting through the port 56, raises the piston or plunger 58, if it is in its lowered position until a point is reached in which the accumulated air pressure within the head and air cylinder becomes equal to the supply pressure of the carbonated water. This prevents the flow of further water into the head; and by regulating the size of the air cylinder before described forms an exact means for controlling the amount of water which is admitted. After the bottle is filled, the operator slightly releases the pressure from the treadle and the piston 58 will be moved upwardly by the pressure in the cylinder 57. This upward movement of the piston or plunger 58 actuates the bell crank lever 79 to rock its depending vertical arm inwardly out of contact with the collar 12 on the sleeve 11. This releases the compression of the spring 14, which reacts to throw the sleeve 11 upwardly, and through the connection 51, raises the filling tube out of the neck portion of the bottle. The withdrawal of the filling tube permits the cap feeding mechanism to move the cap B into position over the mouth of the bottle. The operator then further depresses the treadle lever 15, which moves the entire head downward upon the bottle, forcing the cap B against the lower end of the depending hollow central portion of the plunger 34, the plunger itself being moved upwardly by the resistance of the cap as far as it can go within its chamber in the head; and the die 33 applying the cap under the action of the treadle pressure. When this operation is completed, the treadle pressure is relieved and pressure which is admitted through the port 55 above the piston 34ª, will force said plunger downwardly to eject the capped bottle from the die. The bottle is then removed, a new bottle is placed on the support 30, and the operations are repeated. As soon as the seal and bottle are removed from the die 33 the pressure within the filling head and within the packing chamber 53 is relieved.

I will now proceed to describe the mechanism for selecting and feeding the caps or crowns.

The hopper 10 before described, and into which the mass of caps or crowns is placed, has a discharge opening at 82ª. The caps or crowns discharged at 82ª pass into the open end of a hollow rotating member 83, having the open flared portion 84 (see Fig. 15), which rotates adjacent to the discharge of the hopper. This flared portion has a plurality of tangentially extending ribs or vanes 85, which tend to force the caps inwardly toward the cone-shaped face 86 of a hub portion 87 of the rotating member. The outer end of the chamber within the rotating member is formed by an inwardly dished or coned plate 88, having on its inner coned or convexed face a plurality of radial ribs 89, which are preferably formed with teeth or notches 90, and which are arranged to direct the caps to a series of selecting passages formed between the outer face of the hub portion 87 and the adjacent parallel face of the central portion of the plate 88. These selecting passages are formed by pins 91, which act in a well known manner to permit the caps or crowns to pass therethrough when in proper position, but preventing the passage of the caps in any except the proper position. As the rotary member is rotated, the caps or crowns are gradually worked inwardly by the ribs or vanes 85 until they pass into the chamber between ribs 85 and the ribs 89, and passing down the channels between the ribs 89 to the selecting passages formed by the pins 91. If in proper position, they pass through these passages and thence into a feed chute 92. Caps which are not in proper position, to pass through the selecting passages drop back within the rotating member and are tumbled until eventually they come in the proper position.

After the feed chute and selecting chamber become filled with caps, surplus caps fall back and are rotated within the rotary member until such time as they can be delivered into the chute.

The chute 92, in the particular machine illustrated, is of flexible material, and consists of a strip of metal having a plurality of loops 93 under which the caps pass. The lower end of the chute terminates adjacent to the filling head, as shown in Fig. 4, wherein two caps C are shown as within the lower portion thereof, while the third cap B is shown as in position to be moved into the head, as shown in Fig. 3. The lower end of the chute discharges into a slideway 94, in which works a reciprocating pusher 95. In the form of the invention shown in Fig. 4 this pusher is actuated by a lever 96 pivoted at 97 and having its short arm formed with a heel 98, which is in the path of a pin or projection 99 carried by a reciprocating cylinder 100; and whereby, as the said cylinder is reciprocated in the manner presently described, the lever 96 will be oscillated to move the caps into line with the feed opening 82 of the filling head.

Various means may be provided to move the cap from the position shown at B in Fig. 4 to the position at B in Fig. 3. The mechanism shown in Fig. 4 for this purpose is as follows:—The cylinder member 100 telescopes slidingly over a stationary plug 101, which is screwed into the filling head at 102. The inner end of the cylinder 100 is provided with a packing 103 adapted to form an air-tight joint with the sealing face 104 on the filling head, when the cylinder is moved into the position shown in Fig. 7. For the purpose of actuating this cylinder, the cross-head 24 carries a depending cam 105 (see Fig. 2), whose cam slot 106 is engaged by a roller 107 on one arm of a lever 108 pivoted at 109. The other arm of this lever has a connection 110 with the tubular lug or sleeve 111 on the cylinder 100. It will be seen, therefore, that as the cross-head 24 is moved downwardly, the lever 108 will be moved to thereby move the cylinder 100 from the position shown in Fig. 4 to the position shown in Fig. 7; and that upon the upward movement of the cross-head 24 the movement of the lever 108 will be reversed to return the cylinder to the position shown in Fig. 4. Instead, however, of employing a double-acting cam, 106, such as shown in Fig. 2, I may employ a single-acting cam 112 (see Fig. 19.) In this case it is necessary to provide the spring 113 shown in Figs. 4 and 7, which will be compressed by the forward movement of the cylinder 100, and will act to return said cylinder during the upward movement of the cross-head 24. An air-tight packing 114 is shown between the cylinder 100 and the stationary member 101, so that none of the air from the air chamber of the head can escape through the cylinder 100. The cylinder 100 has secured therein a pin or screw 115, which extends inwardly into the stationary member 101 through an elongated slot 116. Mounted on the inner end portion of this pin or screw is a head 117; and also loosely mounted thereon is a grooved roller 118. The head 117 carries a rod 119 around which is coiled a spring 120, one end of the spring bearing against the head and the other end against a movable cylinder 121 which carries a pusher 122 for engagement with the cap B.

123 is a chain or other flexible member, one end of which is connected at 124 to the pusher 122, and the other end of which is connected at 125 to the stationary member 101.

It will be readily seen that as the cylinder 100 is moved forwardly by the means before described, it will carry with it the pin 115 and roller 116, thereby creating slack in the chain 123, and permitting the spring 120 which has previously been placed under compression, to move forwardly the cylinder 121 and its pusher 122. It will further be seen that the chain will permit the spring to move the pusher twice as fast as the movement of the pin 115, and that the total movement of the pusher 122 will be approximately equal to twice the movement of the pin 115. By this means a comparatively short stroke of the cylinder 100 will give the pusher 122 a sufficient movement to carry the cap B from the position shown in Fig. 4 to the position shown in Fig. 3. There will also be sufficient compression left in the spring 120 to actuate the pusher to carry the cap B from the position shown in Fig. 3 to its position over the mouth of the bottle when the filling tube 36 is withdrawn in the manner before described. The return movement of the cylinder 100, of course, carries with it the pin 115, and, through the flexible member 123, retracts the pusher, and thereby restores the necessary compression for another operation to the spring 120.

In the modification shown in Fig. 6, the cylinder 100ª reciprocates over the stationary member 101ª. Secured to the stationary member is a toothed rack 126, and secured to the cylinder 100ª is a similar rack 127. 128 is a toothed pinion mounted between these racks on a pin or shaft 129 carried by the cylinder 100ª. 130 is a cylinder which carries the pusher 122ª, and which telescopes within a cylinder 131 carried in a head 132, through which the shaft 129 extends. 120ª is a spring corresponding to the spring 120. The operation is substantially the same as with the mechanism shown in Figs. 4 and 7. The plunger 122ª will move forward twice the distance moved by the pin 129.

Fig. 6 also shows a different form of pusher for transferring the cap from the discharge of the feed chute into the feedway leading to the interior of the filling head. In this form the pusher consists of a lever having a curved pusher arm 132. The lever is connected to a shaft 133 carrying a toothed pinion 134. The teeth of this pinion mesh with the teeth of the rack 135 secured to the exterior of the cylinder 100ª. As the cylinder 100ª is reciprocated in the manner before described, the rack and pinion will oscillate the pusher 132. In both forms described, the pusher acts as a stop to hold the lowermost cap from further movement until the pusher is retracted. As soon as the pusher is retracted the gravity of the caps in the feed chute advances the lowermost cap into the path of the retracted pusher and in position to be engaged thereby upon its forward oscillation.

The form of machine just described is particularly adapted for operation by foot power; but my invention is equally applicable to power-driven machines; and in Figs. 12, 13 and 14 I have shown its embodiment in one such form of machine. In these figures, 136 designates a power shaft journaled in the base of the machine and driven by a pulley 137. The shaft 136 carries three cams 138, 139 and 140, these cams having the respective forms best shown in Fig. 14. The cam 138 supports and actuates the bottle support and elevator 141. The bottle support 141 has a depending portion 142, which telescopes within the cylinder 143. 144 is a rod extending upwardly within the part 142, and having an adjustable screw-threaded engagement therewith. This rod passes loosely downward through a sleeve 145 carried by a cross-head 146. The lower end of the rod 144 carries a roller 147, which rests on the cam 138. The cam 139 is arranged to contact with a roller 148 on a lever 149 pivoted at 150 in the base of the machine and connected by helical springs 151 with the cross-head 146. The cam 140 is of wiper form, and is arranged to contact with a roller 152 on the cross-head 146. The cross-head 146 carries the upwardly extending actuating rods 153, which correspond to the rods 20 and 21 of the machine first described, and which are surrounded by sleeves 154 carrying the cross-head 155 on which the filler head is mounted. The sleeves 154 are secured at their lower ends in a cross-head 156 having an opening therethrough for the cylinder 143, and containing a compressible packing or clamp 157. 158 designates sleeves which surround the lower end portions of the rods 153 below the cross-head 156 and normally separated at their upper ends a short distance therefrom. 159 is a pressure pipe which connects the pressure chamber of the head corresponding to the chamber 53 of Fig. 3 with a chamber 160 which surrounds the compressible packing or clamp 157. The communication between the pipe 159 and the chamber 160 is controlled by the vertically movable valve 161, having a downwardly projecting stem 162, which, upon a slight downward movement of the cross-head 156 is arranged to engage a stop 163 on the cross-head 146. The construction of the filling head of this machine is shown in detail in Fig. 13, and is generally similar to that shown in Fig. 3, and to avoid confusion similar reference characters have been applied to the corresponding parts in the two figures. There are, however, certain differences in the two heads, which will now be described. In the head shown in Fig. 13 the filling tube 164 terminates directly above the receiving chamber 165, and has no extension upwardly through the head. Said tube is normally pressed downwardly by a spring 166. In this form of head the adjustment of the air cylinder is effected by the adjustable sleeve 167 extending downwardly within said cylinder and forming a stop for the upward movement of the piston or plunger 168.

The operation of the form of machine shown in Figs. 12, 13 and 14 is as follows: The empty bottle is placed on the support 141, which is resting on the high part of the cam 138. The cam 139 actuates the lever 149 to put the springs 151 in tension, and thereby pull downwardly on the actuating rods 153 to bring the filling head over and around the bottle, as shown in Fig. 13. The downward movement of the filler head is arrested by the contact of the plunger 34 with the mouth of the bottle, no other stop being necessary in this case, as the downward pull on the filler head takes place through the resilient action of the springs 151. The syrup and water-controlling valves are open in substantially the same manner, and by substantially the same means as in the machine first described, and the filling of the bottle takes place in substantially the same manner. When, however, the carbonated water is admitted to the filling head a portion of the pressure is transmitted through the pipe 159 to the chamber 160 of the crosshead 156, thereby setting the compressible packing or clamp frictionally against the cylinder 143. This cylinder is now clamped securely in the crosshead so that a fixed relation will be maintained between the filling head and the base of the machine. At the time the filling operation is completed, and during the time the roller 147 drops into the low portion 138ª of the cam 138, as shown in Fig. 14, thereby lowering the bottle sufficiently to permit the cap B to be moved inwardly between its upper end and the lower end of the filling tube 164 and during the further rotation of the cam 138, the bottle support will be raised to secure the cap to the bottle. As the roller 147 rides upwardly to the high point back of the depression 138ª, the cap will first be engaged by the tube 164, which will center the cap. The further upward movement of the bottle will force the tube 164 against the action of the spring 166, and the bottle and crown will enter the die 33 and force the plunger 34 upwardly against the action of the pressure in the chamber 75ª (which is similar to the chamber 32ᵇ in Fig. 3). This forcing of the cap within the die 33 will secure the crown to the bottle. During this upward movement of the bottle, the head 31 is retained in a fixed position with relation to the frame of the machine by means of the clamping member 157, which is held in position by the pressure within the chamber 160. At this time, the cam 140 begins to raise the cross-head 146, and thereby brings the stop 163 into contact with the valve stem 162, thereby unseating the valve 161 and releasing the pressure from the chamber 160, this pressure being relieved to the atmosphere through the port 160ª, as shown in Fig. 14. The clamping action which has heretofore been exerted by the pressure in this chamber 160 for clamping the filling head in position, is now relieved. When this is done, the cam 139 passes off from the roller 148, and the further action of the wiper cam 140 brings the sleeves 158 into lifting engagement with the cross-head 156 to raise the filler head to its original position. Pressure is admitted through the port 55, as in the form first described, to force downwardly the plunger 34 and thereby discharge the filled and capped bottle from the dies.

Any suitable means may be employed for actuating the rotary member of the cap selector. In Fig. 1, I have shown the shaft 170 to which the rotary member is secured, as having at one end a ratchet wheel 171. The teeth of this ratchet wheel are engaged by a pawl 172 on a lever 173 connected by a link 174 with a collar 175 on the actuating rod 22. By this connection, as the actuating rod is reciprocated, the shaft 170 and its attached rotary member will be rotated to impart the described movement to the caps and cause their selection and discharge into the feed tube.

The advantages of my invention are many, and will be appreciated by those skilled in this art, since it provides a simple and compact form of machine which can be conveniently operated for the rapid filling and capping of bottles. The machine adjusts itself to the bottles being filled and capped, and to different sizes of the same; and provision is also made for the ready and convenient further adjustments as well as for the supply of measured quantities of syrup. The provision of the inclosed air chamber within the head, whereby a pressure can be built up which will balance the pressure of the charged filling water, enables the amount of water supplied to be accurately controlled automatically. Other advantages of my invention result from the provision of means of the nature described for automatically sealing the bottom-opening of the filling head around the neck and mouth of the bottle so that no air can escape, and from the provision of means for air-sealing the cap-feeding opening. My invention also provides means of very simple and effective character for selecting and feeding the caps to the head at proper times relatively to the completion of the successive filling operations.

For the purpose of giving a complete disclosure of the preferred forms of my invention, I have shown and described many parts in detail; but it will be understood that my invention is not limited thereto, but that various changes may be made in the construction and arrangement of the combination of these parts within the scope of the appended claims, without departing from the spirit and scope of my invention.

I claim:—

1. In a machine for filling bottles, a filling head having a bottle-receiving opening, a compressible packing surrounding said opening, a pressure chamber surrounding the packing, said packing having an opening to receive the neck of a bottle therethrough, means for introducing filling liquid under pressure to said head, and a passage connecting the filling head to the chamber around the packing to cause said pressure to hold the packing in contact with a bottle by the filling pressure, substantially as described.

2. In a bottle-filling machine, a filling head having a bottom bottle-receiving opening and a compressible packing, a pressure space or chamber surrounding the packing, said packing having an opening to receive the neck of a bottle therethrough, and means for introducing filling liquid into said head and thence into the bottle, there being a passage communicating with the head and the chamber surrounding the packing to admit fluid pressure to said chamber to hold the packing in contact with the neck of the bottle by means of said fluid pressure, substantially as described.

3. In a machine for filling and capping bottles, a vertically movable filling head having an air chamber into which the back portion of the bottle can be introduced, means for sealing the neck portion of the bottle within the head, a cap-supply passage leading into the head, and automatic means operated by the vertical movement of the head for sealing the cap-supply passage against the entrance of air; substantially as described.

4. In a machine for filling and capping bottles, a vertically movable filling head having an air chamber therein, and means operated by the vertical movement of the head for sealing the chamber while the bottle is being filled, means for introducing caps into said chamber, and a bottle ejecting plunger working in said chamber; substantially as described.

5. In a machine for filling and capping bottles, a filling head having an air chamber therein, and means for sealing the chamber while the bottle is being filled, means for introducing caps into said chamber, and a bottle ejecting plunger working in said chamber, together with means whereby said chamber may be connected above the plunger with a source of pressure supply to thereby actuate the plunger; substantially as described.

6. In a bottle-filling machine, a filling head having a receiving chamber therein and a filling tube communicating with said chamber, the head also having an opening in the lower end thereof, an annular packing within said chamber arranged to encircle the neck of a bottle, a pressure chamber surrounding said packing member, there being a passage connecting said pressure chamber with the receiving chamber for admitting fluid pressure from the receiving chamber to the chamber surrounding the packing to press the packing into contact with the neck of a bottle, and means controlled by the movement of the bottle for admitting fluid pressure to the receiving chamber, substantially as described.

7. In a machine for filling and capping bottles, a filling head having an air chamber therein, and also having a filling tube extending downwardly therethrough and communicating with a source of liquid supply, said head having a cap-feeding opening in one side, means for feeding caps into said chamber into contact with the filling tube and for periodically closing the cap-feeding opening, and means for withdrawing the filling tube after the filling operation, said cap-feeding means then completing the feeding movement of the cap; substantially as described.

8. In a machine for filling and capping bottles, a filling head having an air chamber therein, and means for sealing said chamber during the filling operation, a cap-applying die in said chamber, and a bottle ejecting plunger also seated in said chamber and having a portion working within the die; substantially as described.

9. In a machine for filling and capping bottles, a vertically movable filling head having an air chamber therein, means operated by the vertical movements of the head for feeding caps into said chamber, means for sealing the chamber during the filling operation, and cap-applying means within the head, a bottle ejecting plunger also seated within the head, means whereby the plunger may be actuated, and an air cylinder carried by the head and communicating with the air chamber of the head through the said plunger; substantially as described.

10. In a bottle-filling and capping machine, a vertically movable head having an air chamber therein, means for varying the capacity of the air chamber, means operated by the vertically movable head for introducing caps into the said chamber and for applying the same to the bottles, a bottle ejecting plunger within the head, and means for sealing the air chamber of the head while the bottles are being filled; substantially as described.

11. In a bottle-filling machine having a vertically movable filling tube and also having an air chamber therein, means for sealing the said chamber during the filling operation, an air cylinder in communication with said chamber, a plunger in said cylinder, and means actuated by the plunger for raising the filling tube to withdraw it from the filled bottles together with means for admitting filling liquid to said tube at the proper time; substantially as described.

12. In a machine for filling bottles, a filling head having an air chamber therein, means for sealing said chamber during the filling operation, an air cylinder communicating with the chamber and having a movable piston or plunger, a vertically movable filling tube within the head, and connections operated by said piston or plunger for withdrawing the filling tube from the filled bottles together with means for admitting filling liquid to said tube at the proper time; substantially as described.

13. In a machine for filling bottles, the combination with a bottle support, of a vertically movable filling head, means for bringing the bottle and head into filling relation with each other, the head having a movable filling tube movable vertically with and also independently of the movement of the head, means operated by the movement of the head for lowering the filling tube, and means operable upon the completion of the filling operation for withdrawing the tube from the filled bottle together with means for admitting filling liquid to said tube at the proper time; substantially as described.

14. In a machine for filling bottles, a vertically movable filling head, means for raising and lowering the head, a filling tube, connections for lowering said tube operated by the downward movement of the head, the head having an air chamber therein, a cylinder communicating with the air chamber, a piston in said cylinder, and means operated by the piston for raising the filling tube together with means for admitting filling liquid to said tube at the proper time; substantially as described.

15. In a machine for filling bottles, a vertically movable filling head, means for raising and lowering the head, a filling tube movable vertically within the head, connections operated by the downward movement of the head to lower said tube after an initial independent movement of the head, and means for subsequently permitting further independent downward movement of the head together with means for admitting filling liquid to said tube at the proper time; substantially as described.

16. In a machine for filling bottles, a vertically movable filling head, a filling tube extending within the head, connections for raising and lowering the head, an actuating member connected to the filling tube, and means for operating said member after an initial downward movement of the head together with means for admitting filling liquid to said tube at the proper time; substantially as described.

17. In a machine for filling bottles, the combination with a vertically movable filler head, a vertically movable filler tube extending within the head and capable of independent vertical movement, a lever device carried by the head, a member connected to the filling tube and arranged to be actuated by said lever device after an initial downward movement of the head, and means for subsequently raising the filling tube together with means for admitting filling liquid to said tube at the proper time; substantially as described.

18. In a machine for filling bottles, the combination with a vertically movable filling head, a filling tube within the head and capable of independent vertical movement, a device actuated by the downward movement of the head for lowering the filling tube, and means operable upon the filling of the bottle for retracting the filling tube together with means for admitting filling liquid to said tube at the proper time; substantially as described.

19. In a machine for filling bottles, the combination of a vertically movable filling head, a lever device carried by said head, a filling tube within the head and capable of independent vertical movement therein, a vertically movable actuating member connected to the filling tube and carrying a stop for the lever device, means for limiting the movement of said actuating member, a spring arranged to be compressed by the downward movement of said member, and means for subsequently releasing the engagement between the lever device and said member, whereby the spring will actuate said member to raise the filling tube together with means for admitting filling liquid to said tube at the proper time; substantially as described.

20. In a machine for filling bottles, the combination of a vertically movable filling head, a filling tube extending within the head and capable of independent vertical movement, means operated by the downward movement of the head for lowering the filling tube, and automatic means for subsequently raising said tube together with means for admitting filling liquid to said tube at the proper time; substantially as described.

21. In a machine for filling bottles, the combination of a vertically movable filling head, a filling tube extending within the head and capable of independent vertical movement, means operated by the downward movement of the head for lowering the filling tube, and automatic means for subsequently raising said tube, together with means whereby said head may be given a further downward movement together with means for admitting filling liquid to said tube at the proper time; substantially as described.

22. A machine for filling bottles having a head provided with a bottle-receiving opening and a packing for said opening, and automatic means controlled by the bottle for admitting fluid pressure to set the packing during the filling operation, substantially as described.

23. In a machine for filling and capping bottles, the combination with a filling head having a cap feed-way extending into the same, of a cylinder movable toward and away from the head in line with the feed-way, means for sealing the joint between the cylinder and head when the latter is moved into contact with the head, means for reciprocating the cylinder, and cap-feeding means operated by the movements of the cylinder; substantially as described.

24. In a machine for filling and capping bottles, the combination with a vertically movable filling head having a cap feed-way extending therein, means operated by the vertical movement of the filling head for feeding caps into line with the feed-way, a cylinder movable toward and away from the mouth of the feed-way and adapted to seal the same in one position, means for actuating the cylinder, and a cap pusher actuated by the movements of said cylinder; substantially as described.

25. In a machine for filling and capping bottles, the combination with a filling head having a cap feed-way extending therein, means for feeding caps into line with the feed-way, a cylinder movable toward and away from the mouth of the feed-way and adapted to seal the same in one position, means for actuating the cylinder, and a cap pusher actuated by the movements of said cylinder, the actuating connections between the cap pusher and the cylinder acting to multiply the movement of the pusher relatively to that of the cylinder; substantially as described.

26. In a machine for filling and capping bottles, the combination with a vertically movable filling head having a cap-feeding opening therein, means for delivering the caps adjacent to the mouth of said opening, a pusher device for pushing the caps into the head, an actuating member for the cap-pushing mechanism, and operating connections between the actuating member and the filling mechanism; substantially as described.

27. In a machine for filling and capping bottles, the combination with a vertically movable filling head having a cap-feeding opening therein, means for delivering the caps adjacent to the mouth of said opening, a pusher device for pushing the caps into the head, an actuating member for the cap-pushing mechanism, and operating connections between the actuating member and the filling head, said actuating member being arranged to seal the said opening when in one position; substantially as described.

28. In a machine for filling and capping bottles, the combination with a vertically movable filling head having a cap feed-way leading therein, of a feed chute arranged to deliver caps at a point adjacent to said head, feeding mechanism arranged to move the caps from this position into the head, and connections between the head and the cap-feeding mechanism for actuating the latter; substantially as described.

29. In a machine for filling and capping bottles, the combination with a vertically movable filling head having a cap feed-way leading therein, means actuated by the vertical movements of the filling head for delivering caps at a point adjacent to the head, feeding mechanism for moving the caps from this position into the head, and comprising a reciprocating member, said member being also arranged to seal the feed-way, and actuating connections between the reciprocating member and the filling head; substantially as described.

30. In a machine for filling and capping bottles, the combination with a vertically movable filling head, of cap-feeding mechanism, and connections between the filling head and the cap-feeding mechanism, whereby the movement of the former actuates the latter together with means for admitting filling liquid to the head at the proper time; substantially as described.

31. In a machine for filling and capping bottles, the combination with a vertically movable filling head having a feed-way leading therein, a feed chute arranged to deliver caps adjacent to the filling head, a transfer device arranged to move the cap from this position into a position in line with the feed-way, means for moving the cap from the last named position into the head, and connections operated by the movement of the filling head for actuating the cap-moving means together with means for admitting filling liquid to the head at the proper time; substantially as described.

32. In a machine for filling and capping bottles, the combination with a vertically movable filling head having a cap feed-way leading therein, of a movable member for sealing the feed-way, connections operated by the vertical movement of the filling head for operating said member and a cap pusher operated by said movable member; substantially as described.

33. In a bottle filling and capping machine, the combination with a filling head having a cap feed-way extending therein, of a movable member for periodically sealing the mouth of the feed-way, means for delivering caps at a point adjacent to the filling head, means for moving the caps from this position to a position adjacent to the mouth of the feed-way, and other means for moving the cap from the last named position into the feed-way and head, and actuating connections between both the cap-moving devices and the movable member; substantially as described.

34. In bottle filling and capping mechanism, the combination with a vertically movable filling head, of a cap feed-way leading therein, a movable member for sealing the mouth of the feed-way, and connections for actuating said member by the vertical movement of the filling head and cap-pushing devices arranged to move the cap in two directions at substantially right angles to each other and actuated by the movements of the movable member; substantially as described.

35. In a bottle filling and capping machine, the combination with a filling head, a filling tube within the head, means for conveying the filling liquid into said tube and a capping die connected to the head, said capping die having an opening through which the filling tube can be moved into and out of the bottle together with an ejecting device, the filling tube being movable independently of the ejecting device.

36. In bottle filling and capping mechanism, the combination with a filling head, a filling tube movably mounted within the head, means for conveying the filling liquid into said tube and a capping die connected to the head having a central opening therethrough, through which the filling tube is arranged to be moved into and out of the head together with an ejecting device within the head movable independently of the filling tube.

37. In bottle filling and capping mechanism, the combination with a filling head, of a filling tube movably mounted within said head, a capping die connected to said head having an opening therethrough, a bottle ejecting device movably mounted within the head and arranged to be moved through the capping die for ejecting the bottle, there being an opening through the ejecting device through which the filling tube extends.

38. In a bottle filling and capping machine, the combination with a vertically movable filling head, a vertically movable bottle support movable toward and away from the head, a cap-feeding mechanism operated by the vertical movement of the head, a capping die within the head, a filling tube extending through said die into the bottle, and a source of liquid supply connected to the filling tube, and an automatic control for the source of liquid supply; substantially as described.

39. In a bottle filling and capping mechanism, the combination of a vertically movable bottle support, a vertically movable filling head, means for supplying caps to the interior of the head, a capping die within the head, a vertically movable filling tube extending through the capping die into the bottle, the head having a pressure chamber above the capping die, a bottle-ejecting member having a piston portion in said chamber, and means for admitting pressure to said chamber to actuate said plunger; substantially as described.

40. In a machine for filling and capping bottles, a vertically movable filling head, a vertically movable bottle support, the head having a filling chamber therein and also a closed air chamber to receive the air delivered from the bottle, said head also having a cap-feeding opening, means for feeding caps into said opening, and means for sealing the opening to thereby prevent the escape of pressure from said chambers during the filling operation, and actuating connections whereby the vertical movement of the head controls the operation of the sealing means; substantially as described.

41. In a bottle filling and capping mechanism, the combination with a filling head, a filling tube mounted within the head, means for conveying filling liquid into said tube, and a capping die carried by the head and having an opening therethrough for the filling tube together with an ejector through which the filling tube is movable; substantially as described.

42. In a bottle filling and capping mechanism, the combination with a filling head, a filling tube mounted within the head, means for conveying filling liquid into said tube, a capping die carried by the head and having an opening therethrough for the filling tube, said filling tube being movable through the said die into and out of the bottle, and an air chamber also carried by the head and adapted to receive air expelled from the bottle during filling, there being a passage through the capping die leading to said chamber; substantially as described.

In testimony whereof, I have hereunto set my hand.

P. W. SHIELDS.

Witnesses:
 Geo. H. Parmelee,
 H. M. Corwin.